US012651189B2

(12) United States Patent
Griffin et al.

(10) Patent No.: US 12,651,189 B2
(45) Date of Patent: Jun. 9, 2026

(54) PREDICTING QUBIT ANOMALIES BASED ON UTILIZATION HISTORY

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 815 days.

(21) Appl. No.: 17/893,620

(22) Filed: Aug. 23, 2022

(65) Prior Publication Data

US 2024/0070511 A1 Feb. 29, 2024

(51) Int. Cl.
G06F 16/00 (2019.01)
G06N 10/60 (2022.01)
G06N 10/80 (2022.01)

(52) U.S. Cl.
CPC ............. G06N 10/60 (2022.01); G06N 10/80 (2022.01)

(58) Field of Classification Search
CPC .............................. G06N 10/60; G06N 10/80
USPC ........................................................ 706/31
See application file for complete search history.

(56) References Cited

U.S. PATENT DOCUMENTS

| | | |
|---|---|---|
| 8,386,899 B2 | 2/2013 | Toshiba |
| 2021/0042652 A1 | 2/2021 | Das et al. |
| 2021/0049482 A1 | 2/2021 | Mezzacapo et al. |
| 2021/0374584 A1 | 12/2021 | Coady et al. |
| 2024/0185106 A1* | 6/2024 | Carroll .................. G06N 10/40 707/707 |

OTHER PUBLICATIONS

Biercuk, Michael J., et al., "Optimized Dynamical Decoupling in a Model Quantum Memory," arXiv:0812.5095v3 [quant-ph], Jan. 5, 2009, 7 pages.
Chong, Frederic T., et al., "Programming languages and compiler design for realistic quantum hardware," Nature, vol. 549, Sep. 14, 2017, 8 pages.
Mavadia, Sandeep, et al., "Prediction and real-time compensation of qubit decoherence via machine learning," Nature Communications, Apr. 2016, 6 pages.
Reed, M.D., et al., "Realization of Three-Qubit Quantum Error Correction with Superconducting Circuits," arXiv:1109.4948v1 [quant-ph], Sep. 22, 2011, 10 pages.

* cited by examiner

*Primary Examiner* — Alexandria Y Bromell
(74) *Attorney, Agent, or Firm* — Dority & Manning, P.A.

(57) ABSTRACT

Qubit predictability services for a quantum computing system are disclosed. In one example, a processor device of a computing system receives qubit utilization data that encodes a utilization history for each qubit in a set of qubits of a QCS. The processor device further performs one or more hypothesis tests for each qubit of the set of qubits based on the utilization history for the qubit and a set of quantum algorithms. The processor device further generates one or more predictability scores for each qubit of the set of qubits based on the one or more hypothesis tests for the set of qubits. The processor device further provides an indication of the one or more predictability scores for each qubit of the set of qubits to the QCS.

16 Claims, 7 Drawing Sheets

START

AGGREGATE, AT QUANTUM COMPUTING SYSTEM (QCS) QUBIT UTILIZATION DATA FOR SET OF QUBITS, WHERE QUBIT UTILIZATION DATA IS RECEIVED FROM QUBIT REGISTRY SERVICE, QUANTUM ERROR CORRECTION SERVICE, AND/OR QUANTUM TASK MANAGER SERVICE FOR QCS
82

TRANSMIT QUBIT UTILIZATION DATA FROM QCS TO CLASSICAL COMPUTING SYSTEM (CCS)
84

GENERATE, AT CCS, HYPOTHESES REGARDING QUBIT UTILIZATION, QUBIT PERFORMANCE, AND QUBIT DEGRADATION BASED ON QUBIT UTILIZATION DATA
86

TEST, AT CCS, HYPOTHESES REGARDING QUBIT UTILIZATION, QUBIT PERFORMANCE, AND QUBIT DEGRADATION BASED QUBIT UTILIZATION DATA AND SET OF QUANTUM ALGORITHMS
88

PREDICTING QUBIT ANOMALIES BASED ON UTILIZATION HISTORY

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently and accurately allocate qubits in real time will be desirable.

SUMMARY

The examples disclosed herein implement a qubit predictability service (QPS) for a quantum computing system (QCS). The QPS may predict future qubit utilizations, as well as predict future qubit anomalies. The QPS may provide such predictions to a qubit utilization alert service (QUAS) of the QCS. In response to receiving predictions of such potential future qubit utilizations and qubit anomalies, the QUAS may proactively perform one or more mitigation actions, such as but not limited to a mapping around of qubits with predicted future anomalies, re-routing requests for quantum computational tasks to other available QCSs, or temporality halting or suspending the operation of the QCS. To enable the QPS, the QCS may implement a QPS client and the QUAS. The QPS client may aggregate qubit utilization data from a plurality of services of the QCS. Such services may include, but are not limited to a qubit registry service, a quantum error correction service, and a quantum task manager service. The QPS client may provide the aggregated qubit utilization data to a QPS server implemented at a classical computing system (CCS). THE QPS client may employ resources of the CCS to analyze the qubit utilization data and generate such qubit predictions. That is, the QCS may offload at least some of the computational complexity of generating predictions to the CCS. The CCS may provide the predictions to the QPS client on the QCS. The QPS client may provide the predictions to the QUAS, which initiates the mitigation actions.

In one example, a method for providing qubit predictability services to a QCS include receiving qubit utilization data. The qubit utilization data may be received at a classical computing device and may encode a utilization history for each qubit in a set of qubits of the QCS. The classical computing device may perform one or more hypothesis tests for each qubit of the set of qubits. The hypotheses tests may be based on the utilization history for the qubit and a set of quantum algorithms. The classical computing device may generate one or more predictability scores for each qubit of the set of qubits. The generation of the predictability scores may be based on the one or more hypothesis tests for the set of qubits. The classical computing device may provide an indication of the one or more predictability scores for each qubit of the set of qubits to the QCS.

In another example, a computing device for enabling qubit predictably services is disclosed. The computing device comprises a system memory, and a processor device communicatively coupled to the system memory. The processor device receives qubit utilization data that encodes a utilization history for each qubit in a set of qubits of a QCS. The processor device further performs one or more hypothesis tests for each qubit of the set of qubits based on the utilization history for the qubit and a set of quantum algorithms. The processor device further generates one or more predictability scores for each qubit of the set of qubits based on the one or more hypothesis tests for the set of qubits. The processor device further provides an indication of the one or more predictability scores for each qubit of the set of qubits to the QCS.

In another example, a non-transitory computer-readable medium is disclosed. The non-transitory computer-readable medium stores thereon computer-executable instructions that, when executed, cause one or more processor devices to receive qubit utilization data that encodes a utilization history for each qubit in a set of qubits of a QCS. The one or more processor devices further perform one or more hypothesis tests for each qubit of the set of qubits based on the utilization history for the qubit and a set of quantum algorithms. The one or more processor devices further generate one or more predictability scores for each qubit of the set of qubits based on the one or more hypothesis tests for the set of qubits. The one or more processor devices further provide an indication of the one or more predictability scores for each qubit of the set of qubits to the QCS.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 3A-3B provide flowcharts illustrating a method for providing qubit predictability services to a quantum computing system, according to one example;

DETAILED DESCRIPTION

Figure 1:
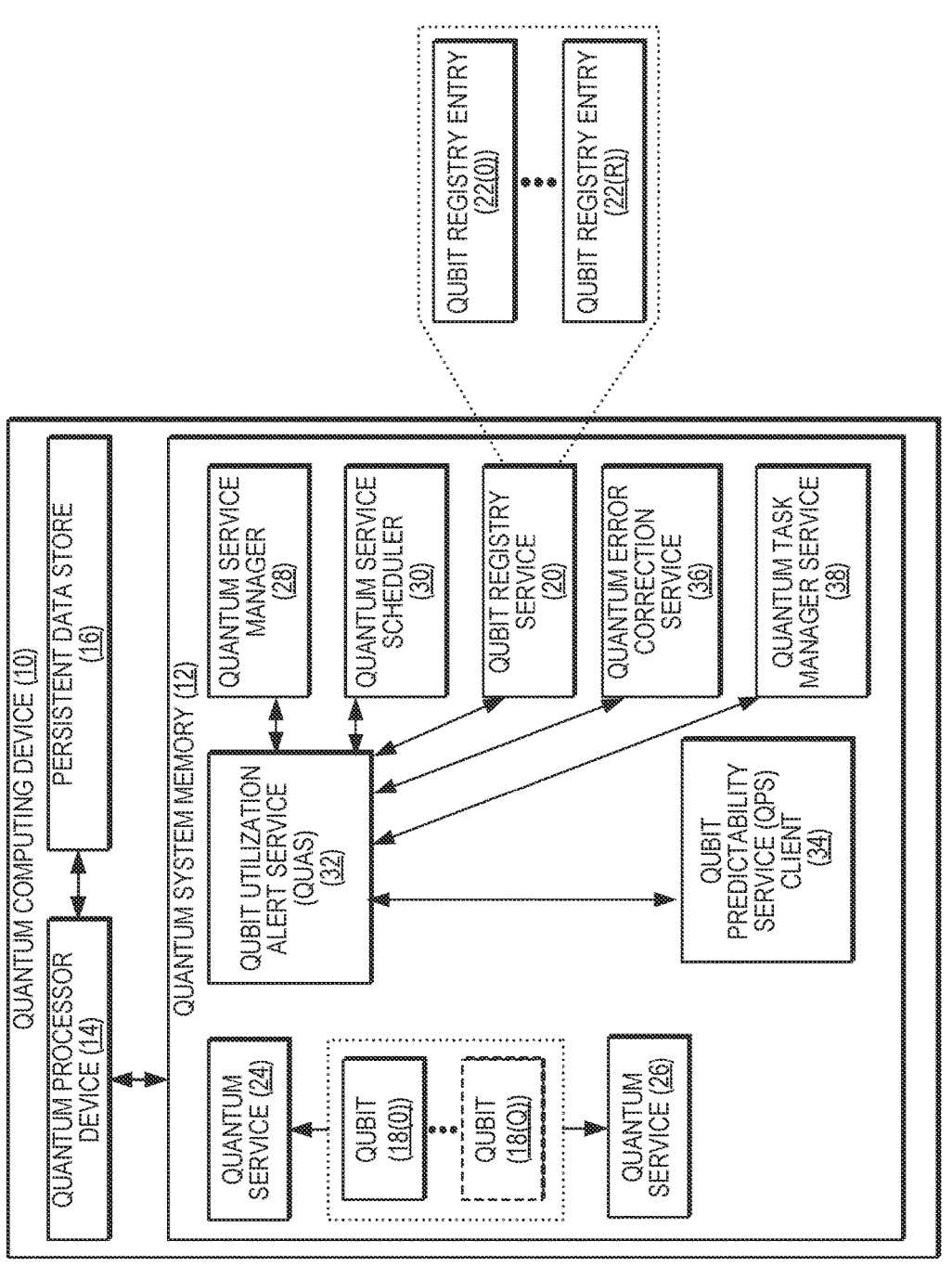
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices. Qubits are prone to errors, spin defects, decay and ultimately decoherence. As such, the embodiments are directed towards systems and methods for proactive management of the qubits of a quantum computing system (QCS).

More particularly, the embodiments are directed towards a quantum utilization alert service (QUAS) and quantum predictability service (QPS). An instantiation of a QUAS and an instantiation of a QPS collaborate to provide qubit-related services to a QCS. In various embodiments, a QPS may be implemented (and/or instantiated) via a combination of the QCS and a classical computing system (CCS) that provides various services to the QCS. The QUAS may be implemented (and/or instantiated) exclusively by the QCS, the CCS, or a combination thereof. The QUAS may aggregate various sources of qubit utilization data for qubits of the QCS. The QUAS may provide the aggregated qubit utilization data to the QPS. The QPS may employ one or more predicative algorithms to analyze the qubit utilization data and predict potential (future) utilizations of and/or anomalies for qubits of the QCS. The QPS may provide the QUAS indications of such predicted (future) qubit utilizations and anomalies. Based on the predicted future utilization and anomalies, the QUAS may perform proactive maintenance tasks to mitigate the likely future qubit anomalies from adversely impacting quantum computational tasks performed by the QCS.

The QUAS may collaborate with a qubit registry service of the QCS, an error correction service of the QCS, and/or a task manager service of the QCS to generate and aggregate the qubit utilization data. Similar to the QUAS, each of the qubit registry service, the error correction service, and the task manager service may be implemented (and/or instantiated) by the CCS, the QCS, or a combination thereof. The qubit registry service is generally responsible for managing and tracking the allocation of qubits for quantum computational tasks performed by the QCS. That is, the qubit registry service tracks an allocation status of each qubit of the set of qubits of the QCS. The qubit registry service may generate at least a first portion of the qubit utilization data. The error correction service is generally responsible for detecting and correcting computational errors associated with quantum computational tasks employing the set of qubits. The error correction service may generate at least a second portion of the qubit utilization data. The task manager service may generally be responsible for managing and scheduling quantum computational tasks for the QCS. The task manager service may generate at least a third portion of the qubit utilization data. The QUAS may aggregate the various portions of the qubit utilization data from these and/or other sources of qubit allocation data.

In some embodiments, the QPS may have a client/server architecture, with a QPS server implemented by the CCS and a QPS client implemented by the QCS. The QPS client may provide the QPS server with the aggregated qubit utilization data. In at least one embodiment, the QPS client may aggregate the various portions of the qubit allocation data rather than the QUAS. The QPS server may include and/or have access to one or more hypothesis testers and one or more quantum simulators.

The QUAS and QPS may enable an analysis of the utilization of the set of qubits with the aim to generate predictability insights. The QPS may implement various predictability algorithms. The QPS may be configured (via configuration rules) to identify utilization patterns of the set of qubits. The utilization patterns may be of interest to the performance, optimization, and/or safety of the QCS, as a whole. Via the QPS client, the qubit utilization data may be provided to the QPS server implemented by the CCS. Through aggregating qubit allocation data from various services and providing the qubit utilization data to the QPS server, the QPS server may algorithmically predict future qubit anomalies (e.g., qubit failures, decay, and other issues). Via the QPS server, the CCS may perform at least a majority of the analyses used to predict future qubit anomalies. The hypothesis tester of the QPS server may perform hypothesis testing on the performance and degradation of the set of qubits. At least a portion of the analysis may be performed via the quantum simulators that are accessible via the QPS server. More specifically, the hypothesis tester may generate predictions of future qubit utilizations and/or qubit anomalies. Such predicted future utilizations and anomalies may be tested via the quantum simulators and/or the hypothesis tester of the QPS server. The results may be fed back into the QUAS of the QCS with one or more predictability scores assigned to each qubit of the set of qubits. The scores may represent multiple metadata points (e.g., performance and/or potential anomalies metadata points). The QUAS may perform various mitigation actions to prevent the predicted future qubit anomalies from adversely effecting the performance of the QCS. For example, the QUAS may orchestrate a mapping around of the potentially anomalous qubits, rotating the qubits out of service, performing a proactive shutdown of the QCS, and/or re-route requests coming to the QCS (over a communication network) to one or more other available QCSs.

In a non-limiting embodiment, a CCS may receive (via a QPS server) qubit utilization data. The qubit utilization data may encode a utilization history for each qubit in a set of qubits included in a QCS. The CCS may generate various hypotheses for the set of qubits and perform hypothesis testing (via the hypothesis tester and/or the quantum simulator) for each qubit of the set of qubits. Generating the hypotheses and testing the hypotheses may be based on the utilization history of each qubit and/or a set of quantum algorithms. For instance, the quantum simulator may simulate at least one quantum algorithm for the set of quantum algorithms. The quantum simulations may be based, at least in part, on the qubit utilization data. The hypothesis tests and/or the quantum simulations may identify various qubit utilization patterns that are encoded in the qubit utilization data. The hypothesis tests may include tests for various qubit performance metrics and/or qubit degradation metrics for the set of qubits. The CCS may generate (via the QPS server) various predictability scores for each qubit based on the hypothesis tests and/or identified qubit utilization patterns.

The CCS may provide at least an indication of the predictability scores to the QCS. For example, the QPS server may provide an encoding of the predictability scores for each qubit to the QPS client.

In at least one embodiment, the CCS may enable (or cause) an identification (or prediction) of a predicted future anomaly for a least a first qubit of the set of qubits based on the predictability scores. The CCS may provide an indication of the predicted future anomaly for the first qubits to the QUAS of the QCS. Identifying the predicted future anomaly may include the CCS (via the QPS server) generating an analysis of the predictability scores for the first qubit. Based on the analysis, the CCS (via the QPS server) may identify the predicted future anomaly for the first qubit. The QPS client (of the QCS) may receive an indication of the predicted future anomaly for the first qubit. The QPS client may provide the indication of the future predicted anomaly to the QUAS of the QCS. The QUAS may implement various mitigation actions to mitigate the predicted future anomaly. For example, the QUAS may provide the indication of the predicted future anomaly to the qubit registry service of the QCS. The QUAS may prevent the QCS for utilizing the first qubit in a future quantum computational task. The QUAS may cause a rerouting of quantum computational requests to another available QCS.

FIG. 1 is a block diagram of a quantum computing system 10 that comprises a quantum system memory 12 and a quantum processor device 14. The quantum computing system 10 further comprises a persistent data store 16 (e.g., a hard drive or Solid State Drive (SSD), as non-limiting examples). It is to be understood that the quantum computing system 10 in some examples may include constituent elements in addition to those illustrated in FIG. 1. The quantum computing system 10 operates in quantum environments but is capable of operating using classical computing principles or quantum computing principles. Thus, in some implementations, portions of the quantum computing system 10 may be executed using classical computing components and/or algorithms.

When using quantum computing principles, the quantum computing system 10 performs computations that utilize quantum-mechanical phenomena, such as superposition and/or entanglement states. The quantum computing system 10 may operate under certain environmental conditions, such as at or near zero degrees (0°) Kelvin. When using classical computing principles, the quantum computing system 10 utilizes binary digits that have a value of either zero (0) or one (1).

In the example of FIG. 1, the quantum computing system 10 implements a set of one or more qubits 18(0)-18(Q) for use by quantum services executed by the quantum computing system 10. To maintain information for the qubit(s) 18(0)-18(Q), the quantum computing system 10 includes a qubit registry service 20, which comprises a plurality of qubit registry entries 22(0)-22(R) each corresponding to a qubit such as the one or more qubits 18(0)-18(Q). The qubit registry service 20 maintains and provides access to data relating to the qubits implemented by the quantum computing system 10, such as a count of the total number of qubits implemented by the quantum computing system 10 and a count of the number of available qubits that are currently available for allocation, as non-limiting examples. Each of the qubit registry entries 22(0)-22(R) of the qubit registry 20 also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an quantum phenomena indicator that indicates whether the corresponding qubit is in an entangled state and/or a superposition state.

The quantum computing system 10 of FIG. 1 executes one or more quantum services, such as the quantum service 24, the quantum service 26, the quantum error correction service 36, and the quantum task manager service 38. The quantum service 24 and the quantum service 26 are processes that employ qubits such as the one or more qubits 18(0)-18(Q) to provide desired functionality. Execution of quantum services such as the quantum service 24 and the quantum service 26 is facilitated by a quantum service manager 28 and a quantum service scheduler 30. The quantum service manager 28 of the quantum computing system 10 handles operations for creating, monitoring, and terminating quantum services, while the quantum service scheduler 30 of the quantum computing system 10 controls the scheduling of quantum services for execution by the quantum processor device 14, and allocation of processing resources to executing quantum services. The functionality of the quantum service manager 28 and the quantum service scheduler 30 may be made accessible to other processes (e.g., via a defined application programming interface (API), as a non-limiting example).

Figure 2:
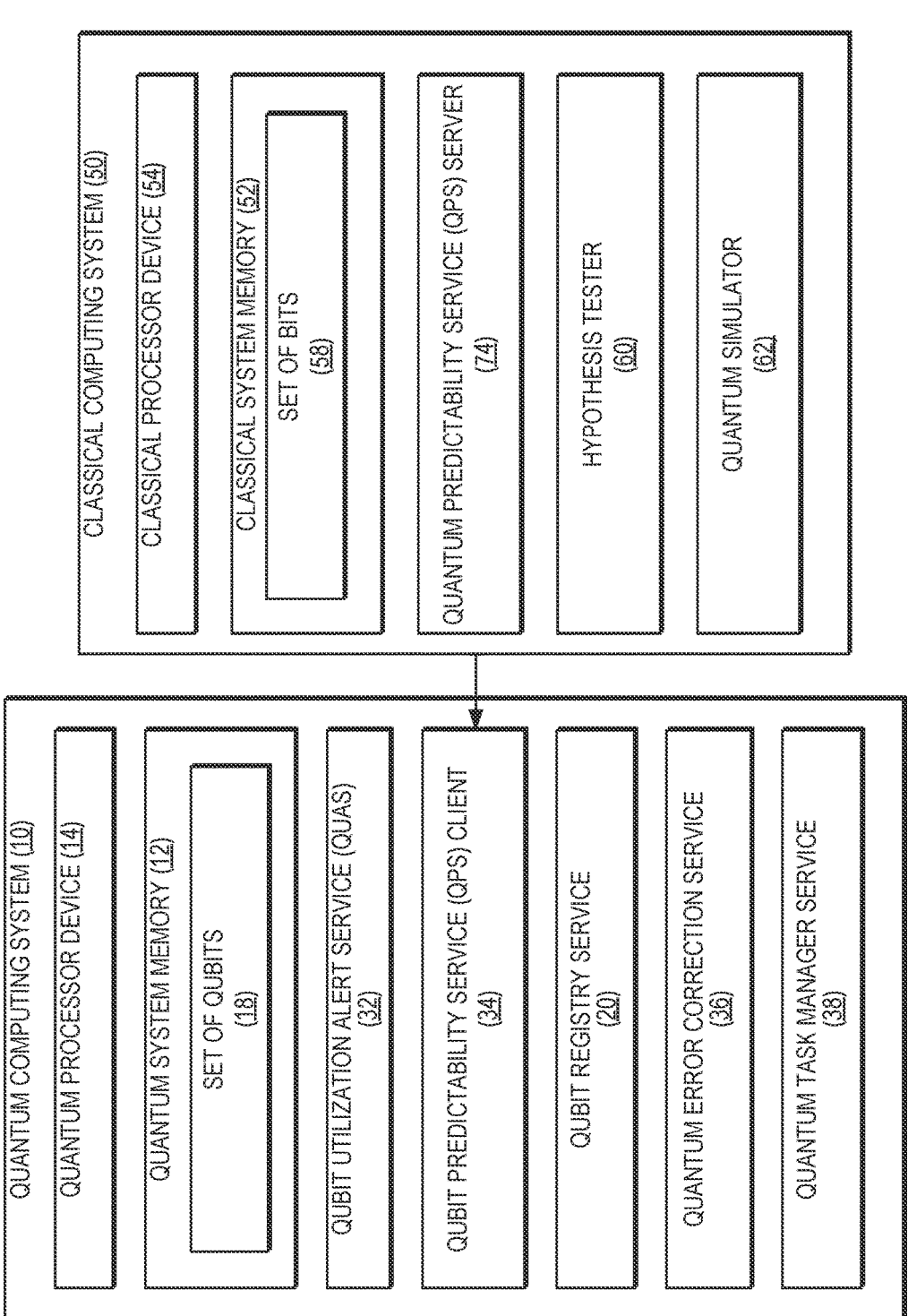
FIG. 2 is a block diagram of the quantum computing system of FIG. 1 and a classical computing system that cooperate together to provide qubit predictability services, in accordance with various embodiments.

The quantum error correction service 36 is generally responsible for detecting and correcting computational errors associated with quantum computational tasks employing qubits 18(0)-18(Q). The quantum error correction service 36 may generate at least a portion of the qubit utilization data (as discussed below in conjunction with qubit utilization alert service (QUAS) 32 and the qubit predictability ser (QPS) client 34). The quantum task manager service 38 may generally be responsible for managing and scheduling quantum computational tasks for the QCS 10. The quantum task manager service 38 may generate at least another portion of the qubit utilization data. As also discussed below, the qubit registry service 20 may generate still another portion of the qubit utilization data. The QUAS 32 and the QPS client 34 collaborate with components of a classical computing system, as shown in FIG. 2. Accordingly, the functionality and operations of these components are discussed in conjunction with FIG. 2.

FIG. 2 is a block diagram of the quantum computing system 10 of FIG. 1 and a classical computing system 50 that cooperate together to provide qubit predictability services, in accordance with various embodiments. As discussed in conjunction with FIG. 1, quantum computing system (QCS) 10 includes the quantum processor device 14 and the quantum system memory 12, which includes a set of qubits 18. The QCS 10 additionally includes a qubit utilization alert service (QUAS) 32 and the qubit predictability service (QPS) 34. As discussed in conjunction with FIG. 1, the QCS further includes the qubit registry service 20, the quantum error correction service 36, and the quantum task manager service 38.

The classical computing system (CCS) 50 includes a classical processor device 54 and classical system memory 52, which includes a classical set of bits 58. The CCS 50 further includes a QPS server 74, a hypothesis tester 60, and a quantum simulator 62.

The QUAS 32 may aggregate various sources of qubit utilization data for qubits of the QCS 10. The QUAS 32 may provide the aggregated qubit utilization data to the QPS client 34. The QPS client 34 may provide the aggregated qubit utilization data to the QPS server 74. The QPS server 74 may employ one or more predicative algorithms to analyze the qubit utilization data and predict potential (future) utilizations of and/or anomalies for qubits of the QCS 10. The QPS server 74 may provide the QUAS 32 indications of such predicted (future) qubit utilizations and anomalies. The QPS client 34 may serve as an intermediary (e.g., a data relayer) between the QPS server 74 and the QUAS 32. Based on the predicted future utilization and anomalies, the QUAS 32 may perform proactive maintenance tasks to mitigate the likely future qubit anomalies from adversely impacting quantum computational tasks performed by the QCS 10.

The QUAS 32 may collaborate with the qubit registry service 20 of the QCS 10, the quantum error correction service 36 of the QCS 10, and/or a quantum task manager service 38 of the QCS 10 to generate and/or aggregate the qubit utilization data. As previously noted, the qubit registry service 20 is generally responsible for managing and tracking the allocation of qubits for quantum computational tasks performed by the QCS 10. That is, the qubit registry service 20 tracks an allocation status of each qubit of the set of qubits 18 of the QCS 10. The qubit registry service 20 may generate at least a first portion of the qubit utilization data. The quantum error correction service 36 is generally responsible for detecting and correcting computational errors associated with quantum computational tasks employing the set of qubits 18. The quantum error correction service 36 may generate at least a second portion of the qubit utilization data. The quantum task manager service 38 may generally be responsible for managing and scheduling quantum computational tasks for the QCS 10. The quantum task manager service 38 may generate at least a third portion of the qubit utilization data. The QUAS 32 may aggregate the various portions of the qubit utilization data from these and/or other sources of qubit allocation data.

As also noted above, the QPS client 34 may provide the QPS server 74 with the aggregated qubit utilization data. In at least one embodiment, the QPS client 34 may aggregate the various portions of the qubit allocation data rather than the QUAS 32. As shown in FIG. 2, the QPS server 74 may include and/or have access to one or more hypothesis testers (e.g., hypothesis tester 60) and one or more quantum simulators (e.g., quantum simulator 62). The combination of the QPS client 34 and the QPS server 74 may be collectively referred to as the QPS The QUAS 32 and QPS may enable an analysis of the utilization of the set of qubits 18 with the aim to generate predictability insights. The QPS server 74 may implement various predictability algorithms. The QPS server 74 may be configured (via configuration rules) to identify utilization patterns of the set of qubits 18. The utilization patterns may be of interest to the performance, optimization, and/or safety of the QCS 10, as a whole. Via the QPS client 34, the qubit utilization data may be provided to the QPS server 74. Through aggregating qubit allocation data from various services and providing the qubit utilization data to the QPS server 74, the QPS server 74 may algorithmically predict future qubit anomalies (e.g., qubit failures, decay, and other issues). Via the QPS server 74, the CCS 50 may perform at least a majority of the analyses used to predict future qubit anomalies. The hypothesis tester 60 of the CCS 50 may perform hypothesis testing on the performance and/or degradation of the set of qubits 18. At least a portion of the analysis may be performed via the quantum simulators (e.g., quantum simulator 62) that are accessible via the QPS server 74. More specifically, the hypothesis tester 60 may generate predictions of future qubit utilizations and/or qubit anomalies. Such predicted future utilizations and anomalies may be tested via the quantum simulator 62 and/or the hypothesis tester 60 of the QPS server 74. The results may be fed back into the QUAS 32 of the QCS 10 with one or more predictability scores assigned to each qubit of the set of qubits 18. The scores may represent multiple metadata points (e.g., performance and/or potential anomalies metadata points). The QUAS 32 may perform various mitigation actions to prevent the predicted future qubit anomalies from adversely affecting the performance of the QCS 10. For example, the QUAS 32 may orchestrate a mapping around of the potentially anomalous qubits, rotating the qubits out of service, performing a proactive shutdown of the QCS 10, and/or re-route requests coming to the QCS 10 (over a communication network) to one or more other available QCSs.

In a non-limiting embodiment, a CCS 50 may receive (via a QPS server 74) qubit utilization data. The qubit utilization data may encode a utilization history for each qubit in a set of qubits 18 included in a QCS 10. The CCS 50 may generate various hypotheses for the set of qubits 18 and perform hypothesis testing (via the hypothesis tester 60 and/or the quantum simulator) for each qubit of the set of qubits 18. Generating the hypotheses and testing the hypotheses may be based on the utilization history of each qubit and/or a set of quantum algorithms. For instance, the quantum simulator may simulate at least one quantum algorithm for the set of quantum algorithms. The quantum simulations may be based, at least in part, on the qubit utilization data. The hypothesis tests and/or the quantum simulations may identify various qubit utilization patterns that are encoded in the qubit utilization data. The hypothesis tests (implemented via the hypothesis tester 60) may include tests for various qubit performance metrics and/or qubit degradation metrics for the set of qubits 18. The CCS 50 may generate (via the QPS server 74) various predictability scores for each qubit based on the hypothesis tests and/or identified qubit utilization patterns. The CCS 50 may provide at least an indication of the predictability scores to the QCS 10. For example, the QPS server 74 may provide an encoding of the predictability scores for each qubit to the QPS client 34.

In at least one embodiment, the CCS 50 may enable (or cause) an identification (or prediction) of a predicted future anomaly for a least a first qubit of the set of qubits 18 based on the predictability scores. The CCS 50 may provide an indication of the predicted future anomaly for the first qubits to the QUAS 32 of the QCS 10. Identifying the predicted future anomaly may include the CCS 50 (via the QPS server 74) generating an analysis of the predictability scores for the first qubit. Based on the analysis, the CCS 50 (via the QPS server 74) may identify the predicted future anomaly for the first qubit. The QPS client 34 (of the QCS 10) may receive an indication of the predicted future anomaly for the first qubit. The QPS client 34 may provide the indication of the future predicted anomaly to the QUAS 32 of the QCS 10. The QUAS 32 may implement various mitigation actions to mitigate the predicted future anomaly. For example, the QUAS 32 may provide the indication of the predicted future anomaly to the qubit registry service 20 of the QCS 10. The QUAS 32 may prevent the QCS 10 for utilizing the first qubit in a future quantum computational task. The QUAS 32 may cause a rerouting of quantum computational requests to another available QCS 10.

As noted above, a portion of the qubit utilization data may be generated by the qubit registry service 20 of the QCS 10. The qubit registry service 20 may track an allocation status for each qubit of the set of qubits 18. Another portion of the qubit utilization data may be generated by a quantum error correction service 36 of the QCS 10. The quantum error correction service 36 tracks an allocation status of each qubit of the set of qubits 18. Still another portion of the qubit utilization data may be generated by a quantum task manager service 38 of the QCS 10. The quantum task manager may schedule and/or manage quantum computational tasks for the QCS 10. For example, the quantum task manager may handle computational task requests from clients of the QCS 10.

Figure 3B:
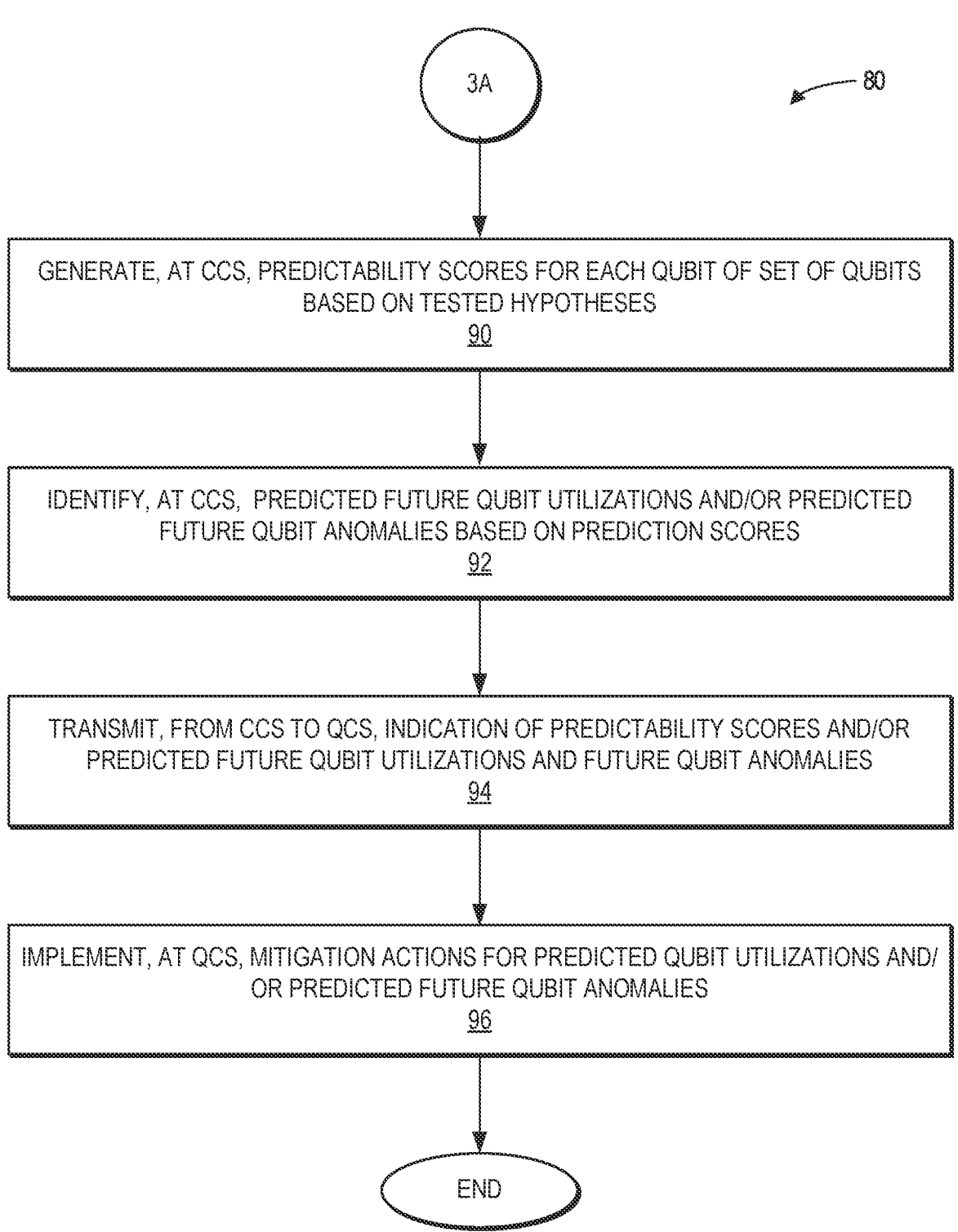

To illustrate exemplary operations performed by the quantum computing system (QCS) 10 and classical computing system (50) of FIGS. 1-2 to implement qubit predictability services according to one example, FIGS. 3A and 3B provide a flowchart illustrating a method 80. Elements of FIGS. 1-2 are referenced in describing FIGS. 3A and 3B for the sake of clarity.

Method 80 begins, after a start block, at block 82, where qubit utilization data for a set of qubits is aggregated at the QCS. The qubit utilization data may be received from one or more sources, such as but not limited to a qubit register service of the QCS, a quantum error correction service of the QCS, and/or a quantum task manager service of the QCS. At block 84, the qubit utilization data may be transmitted for the QCS to a classical computing system (CCS). At block 86 and at the CCS, one or more hypotheses regarding qubit utilization, qubit performance, and/or qubit degradation for set of qubits may be generated. Generating the hypotheses may be based on the received qubit utilization data. At block 88, each of the hypotheses may be tested at the CCS based on the qubit utilization data and a set of quantum algorithms. For example, a quantum simulator may simulate the quantum algorithms of the set of quantum algorithms based on the qubit utilization data.

Referring to FIG. 3B, at block 90, one or more predictability scores may be generated for each qubit of the set of qubits. The predictability scores may be generated at the CCS or at the QCS. The predictability scores may be generated based on the tested hypotheses. At block 92, predicted future qubit utilizations and/or predicted future qubit anomalies may be identified at the CCS and/or the QCS. The predictions may be identified based on the predictability scores. At block 94, indications of the predictions may be transmitted from the CCS to the QCS. At block 96, the QCS may implement one or more mitigation actions for the predictions (e.g., predicted future qubit utilizations and/or predicted future qubit anomalies). Such mitigations actions may include orchestrating a mapping around of the potentially anomalous qubits, rotating the qubits out of service, performing a proactive shutdown of the QCS, and/or re-route requests coming to the QCS (over a communication network) to one or more other available QCSs.

Figure 4:
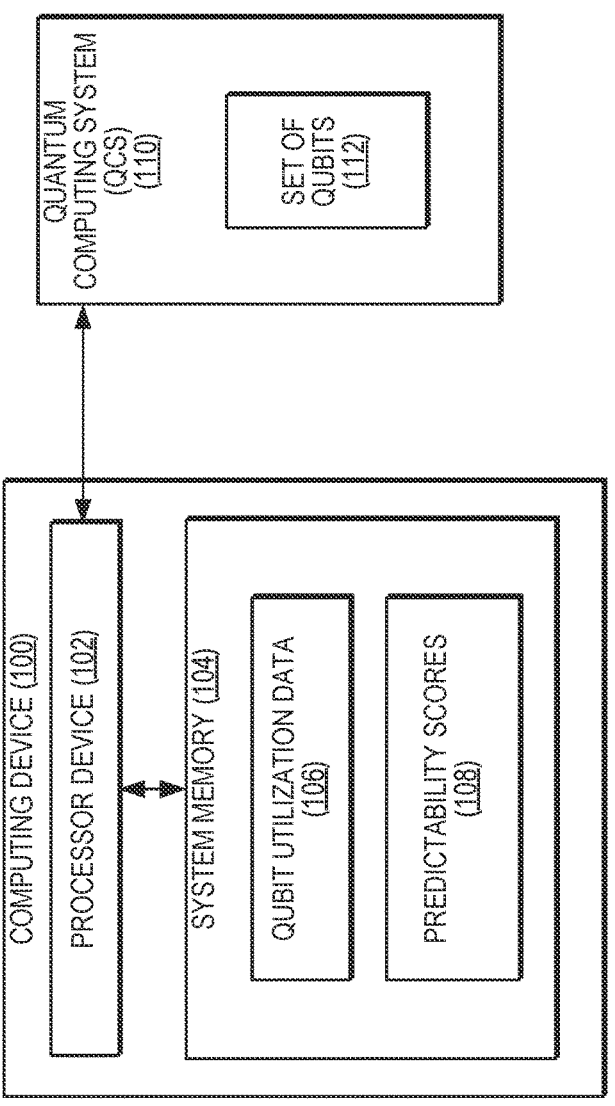
FIG. 4 is a simpler block diagram of the quantum computing system and of the classical computing system of FIG. 2 for provide qubit predictability services, according to one example.

FIG. 4 is a block diagram of a computing device 100 and a quantum computing system (QCS) 110 for enabling qubit predictability services, according to various embodiments. In the example of FIG. 4, the computing device 100 comprises a system memory 104 and a processor device 102. The system memory stores 104 stores qubit utilization data 106 and qubit predictability scores 108. The QCS 110 includes a set of qubits 112. The processor device 102 is communicatively coupled to the system memory 104. Via instructions stored in the system memory 104, the processor device 102 is configured to receive qubit utilization data 106 from the QCS 110. The qubit utilization data 106 may encode a utilization history for each qubit in the set of qubits 112 of the QCS.

The processor device 102 may perform one or more hypothesis tests for each qubit of the set of qubits 112. The hypothesis tests may be based on the utilization history for the qubit and a set of quantum algorithms. The processor device 102 may generate the predictability scores 108 for each qubit of the set of qubits 112. The predictability scores 108 may be generated based on the one or more hypothesis tests for the set of qubits 112. The processor device 102 may provide an indication of the predictability scores 108 for each qubit of the set of qubits 112 to the QCS 110.

Figure 5:
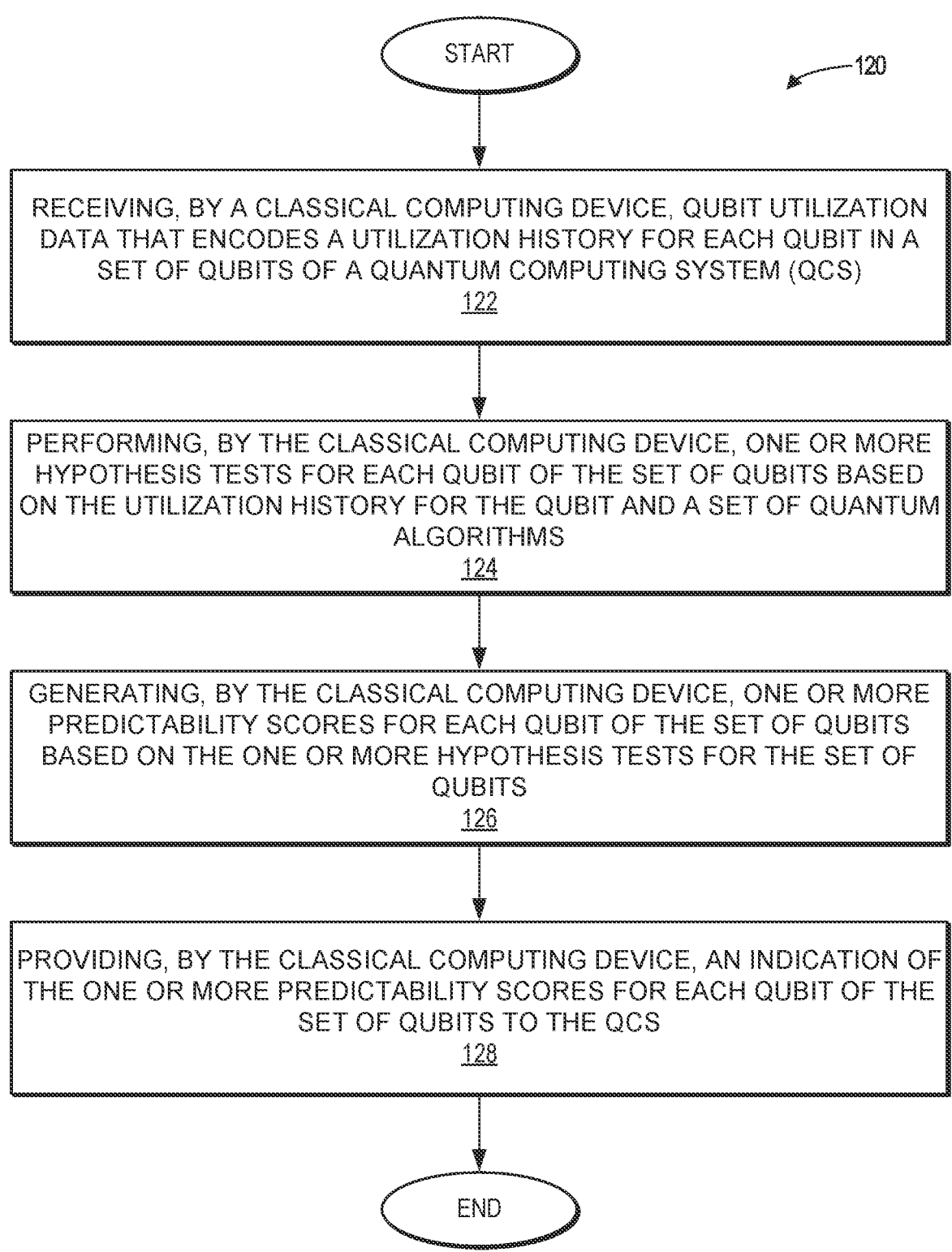
FIG. 5 is a flowchart of a simplified method for qubit allocation for providing qubit predictability services to a quantum computing system, according to one example.

FIG. 5 provides a flowchart for a simplified method 120 for enabling qubit predictability services for a quantum computing system (QCS), as implemented by a classical computing device (CCD), according to one example). Method 120 begins, after a start block, at block 122, where qubit utilization data is received. The qubit utilization data may be received at a classical computing device and may encode a utilization history for each qubit in a set of qubits of the QCS. At block 124, the classical computing device may perform one or more hypothesis tests for each qubit of the set of qubits. The hypotheses tests may be based on the utilization history for the qubit and a set of quantum algorithms. At block 126, the classical computing device may generate one or more predictability scores for each qubit of the set of qubits. The generation of the predictability scores may be based on the one or more hypothesis tests for the set of qubits. At block 128, the classical computing device may provide an indication of the one or more predictability scores for each qubit of the set of qubits to the QCS.

Figure 6:
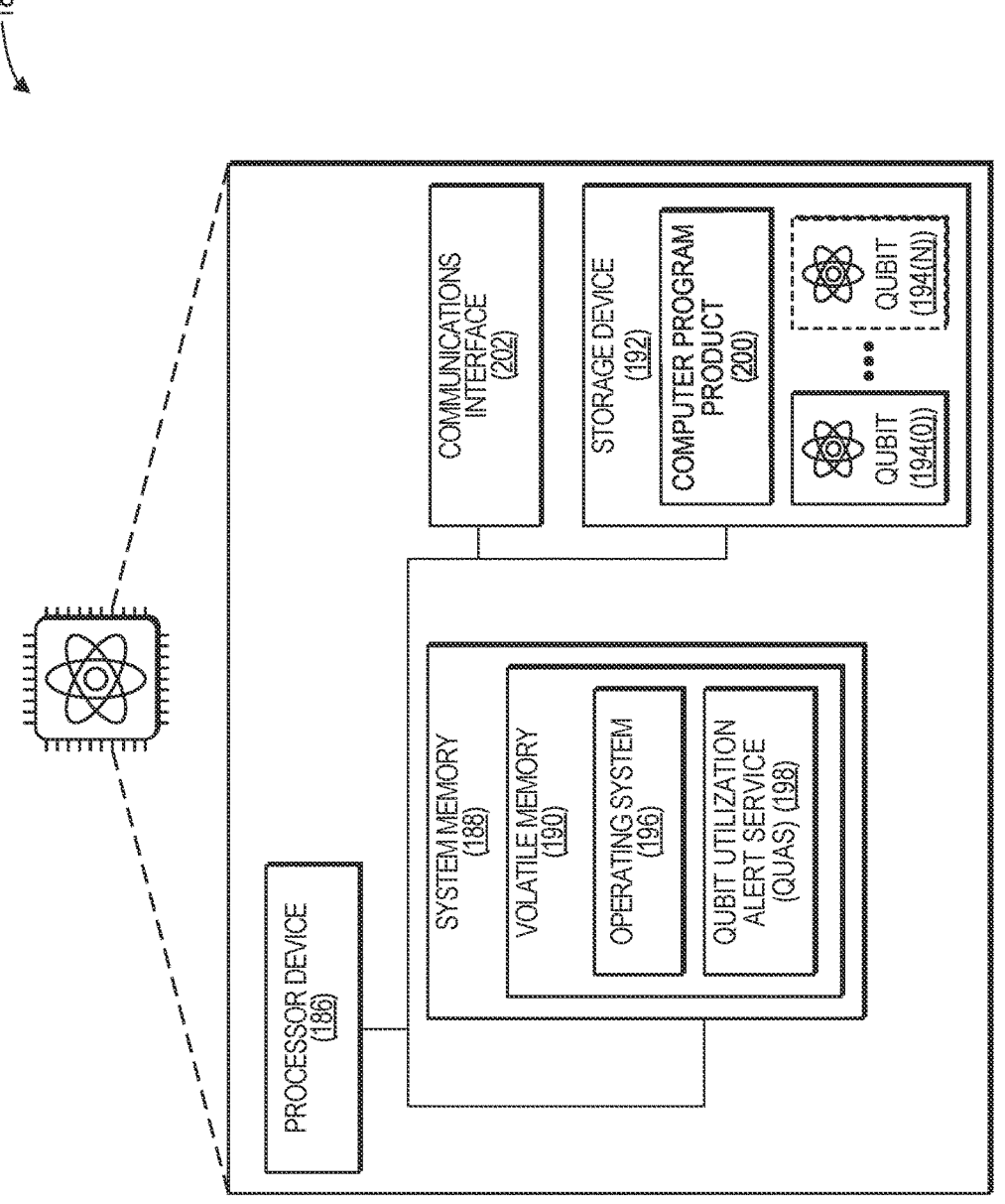
FIG. 6 is a block diagram of a quantum computing device suitable for implementing examples, according to one example.

FIG. 6 is a block diagram of a quantum computing device 184, such as the quantum computing system 10 of FIG. 1, suitable for implementing examples according to one example. The quantum computing device 184 may comprise any suitable quantum computing device or devices. The quantum computing device 184 can operate using classical computing principles or quantum computing principles. When using quantum computing principles, the quantum computing device 184 performs computations that utilize quantum-mechanical phenomena, such as superposition and entanglement. The quantum computing device 184 may operate under certain environmental conditions, such as at or near zero degrees (0°) Kelvin. When using classical computing principles, the quantum computing device 184 utilizes binary digits that have a value of either zero (0) or one (1).

The quantum computing device 184 includes a processor device 186 and a system memory 188. The processor device 186 can be any commercially available or proprietary processor suitable for operating in a quantum environment. The system memory 188 may include volatile memory 190 (e.g., random-access memory (RAM)). The quantum computing device 184 may further include or be coupled to a non-transitory computer-readable medium such as a storage device 192. The storage device 192 and other drives associated with computer-readable media and computer-usable media may provide non-volatile storage of data, data structures, computer-executable instructions, and the like. The storage device 192 may also provide functionality for storing one or more qubits 194(0)-194(N).

A number of modules can be stored in the storage device 192 and in the volatile memory 190, including an operating system 196 and one or more modules, such as a qubit utilization alert service (QUAS) 198. All or a portion of the examples may be implemented as a computer program product 200 stored on a transitory or non-transitory computer-usable or computer-readable medium, such as the storage device 192, which includes complex programming instructions, such as complex computer-readable program code, to cause the processor device 186 to carry out the steps described herein. Thus, the computer-readable program code can comprise computer-executable instructions for implementing the functionality of the examples described herein when executed on the processor device 186.

An operator may also be able to enter one or more configuration commands through a keyboard (not illustrated), a pointing device such as a mouse (not illustrated), or a touch-sensitive surface such as a display device (not illustrated). The quantum computing device 184 may also include a communications interface 202 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a classical computing device, qubit utilization data that encodes a utilization history for each qubit in a set of qubits of a quantum computing system (QCS);

performing, by the classical computing device, one or more hypothesis tests for each qubit of the set of qubits based on the utilization history for the qubit and a set of quantum algorithms, wherein performing the one or more hypothesis tests comprises simulating, via one or more quantum computer simulators, the set of quantum algorithms using the qubit utilization data;

generating, by the classical computing device, one or more predictability scores for each qubit of the set of qubits based on the one or more hypothesis tests for the set of qubits; and providing, by the classical computing device, an indication of the one or more predictability scores for each qubit of the set of qubits to the QCS, wherein providing the indication of the one or more predictability scores comprises:

generating, by the classical computing device, an analysis of the one or more predictability scores for a first qubit; and identifying, by the classical computing device, a predicted future anomaly of the first qubit based on the analysis of the one or more predictability scores for the first qubit.

2. The method of claim 1, further comprising:

implementing, by the QCS, one or more mitigation actions to mitigate the predicted future anomaly for the first qubit.

3. The method of claim 2, wherein the one or more mitigation actions include at least one of providing an indication of the predicted future anomaly for the first qubit to a qubit registry service of the QCS, preventing the QCS from utilizing the first qubit in a future quantum computational task, or rerouting computational requests to another QCS.

4. The method of claim 1, wherein at least a portion of the qubit utilization data was generated by a qubit registry service of the QCS that tracks an allocation status of each qubit of the set of qubits.

5. The method of claim 1, wherein at least a portion of the qubit utilization data was generated by an error correction service of the QCS that detects and corrects errors associated with quantum computational tasks employing the set of qubits.

6. The method of claim 1, wherein at least a portion of the qubit utilization data was generated by a task manager service of the QCS that schedules quantum computational tasks for the QCS.

7. The method of claim 1, wherein a quantum predictability service (QPS) of the QCS is configured to perform the one or more hypothesis tests.

8. The method of claim 7, wherein a QPS client is implemented by the QCS, the QPS client being configured to generate the qubit utilization data by aggregating data generated at the QCS and to provide the qubit utilization data to the QPS.

9. The method of claim 1, wherein the one or more hypothesis tests includes tests for one or more performance metrics for the set of qubits or one or more degradation metrics for the set of qubits.

10. The method of claim 1, wherein performing the one or more hypothesis tests comprises:

identifying one or more qubit utilization patterns encoded in the qubit utilization data.

11. A computing device, comprising:

a system memory; and a processor device communicatively coupled to the system memory, the processor device to:

receive qubit utilization data that encodes a utilization history for each qubit in a set of qubits of a quantum computing system (QCS);

perform one or more hypothesis tests for each qubit of the set of qubits based on the utilization history for the qubit and a set of quantum algorithms, wherein performing the one or more hypothesis tests comprises simulating, via one or more quantum computer simulators, the set of quantum algorithms using the qubit utilization data;

generate one or more predictability scores for each qubit of the set of qubits based on the one or more hypothesis tests for the set of qubits; and provide an indication of the one or more predictability scores for each qubit of the set of qubits to the QCS, wherein, to provide the indication of the one or more predictability scores, the processor device is to:

generate an analysis of the one or more predictability scores for a first qubit; and identify a predicted future anomaly of the first qubit based on the analysis of the one or more predictability scores for the first qubit.

12. The computing device of claim 11, wherein the processor device further:

causes an implementation of one or more mitigation actions to mitigate the predicted future anomaly for the first qubit.

13. The computing device of claim 12, wherein the one or more mitigation actions include at least one of providing an indication of the predicted future anomaly for the first qubit to a qubit registry service of the QCS, preventing the QCS from utilizing the first qubit in a future quantum computational task, or rerouting computational requests to another QCS.

14. A non-transitory computer-readable medium having stored thereon computer-executable instructions that, when executed, cause one or more processor devices to:

receive qubit utilization data that encodes a utilization history for each qubit in a set of qubits of a quantum computing system (QCS);

perform one or more hypothesis tests for each qubit of the set of qubits based on the utilization history for the qubit and a set of quantum algorithms, wherein performing the one or more hypothesis tests comprises simulating, via one or more quantum computer simulators, the set of quantum algorithms using the qubit utilization data;

generate one or more predictability scores for each qubit of the set of qubits based on the one or more hypothesis tests for the set of qubits; and provide an indication of the one or more predictability scores for each qubit of the set of qubits to the QCS, wherein, to provide the indication of the one or more predictability scores, the computer-executable instructions cause the one or more processor devices to:

generate an analysis of the one or more predictability scores for a first qubit; and identify a predicted future anomaly of the first qubit based on the analysis of the one or more predictability scores for the first qubit.

15. The method of claim 1, wherein providing the indication of the one or more predictability scores further comprises:

providing, by the classical computing device, an indication of the predicted future anomaly for the first qubit to the QCS.

16. The computing device of claim 11, wherein, to provide the indication of the one or more predictability scores, the processor device further:

provides an indication of the predicted future anomaly for the first qubit to the QCS.

\* \* \* \* \*